United States Patent
Nakagawa

(10) Patent No.: US 8,370,723 B2
(45) Date of Patent: Feb. 5, 2013

(54) COMMUNICATION APPARATUS AND CONTROL METHOD THEREOF

(75) Inventor: Kaori Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 526 days.

(21) Appl. No.: 12/601,230

(22) PCT Filed: Mar. 25, 2009

(86) PCT No.: PCT/JP2009/056766
§ 371 (c)(1),
(2), (4) Date: Nov. 20, 2009

(87) PCT Pub. No.: WO2009/123246
PCT Pub. Date: Oct. 8, 2009

(65) Prior Publication Data
US 2010/0174953 A1    Jul. 8, 2010

(30) Foreign Application Priority Data
Apr. 4, 2008  (JP) ................... 2008-098750

(51) Int. Cl.
*H03M 13/00* (2006.01)
*H04L 1/18* (2006.01)
(52) U.S. Cl. ....................... 714/776; 714/748
(58) Field of Classification Search ............. 714/776, 714/748; 370/331, 216
See application file for complete search history.

(56) References Cited

U.S. PATENT DOCUMENTS

| 5,699,366 A | 12/1997 | Ono |
| 6,944,123 B1* | 9/2005 | Moon ............... 370/216 |
| 2004/0001221 A1* | 1/2004 | McCallum ............ 358/1.15 |
| 2007/0036142 A1* | 2/2007 | Veschi et al. ............ 370/352 |
| 2012/0110403 A1* | 5/2012 | Chen et al. ............ 714/748 |

FOREIGN PATENT DOCUMENTS

| JP | 4-255166 | 9/1992 |
| JP | 2001-16422 | 1/2001 |

OTHER PUBLICATIONS

"ITU-T V.34" Telecommunication Standardization Sector of ITU Series V: Data Communication Over the Telephone Network Feb. 1998.*

* cited by examiner

*Primary Examiner* — Cynthia Britt
(74) *Attorney, Agent, or Firm* — Fitzpatrick, Cella, Harper & Scinto

(57) ABSTRACT

A communication apparatus complying with the ITU-T Recommendations v.34 and control method thereof are disclosed. The communication apparatus predicts a timing at which reception of image data in an amount of the error frames sent from another communication device is terminated, based on the number of error frames which are not normally received when receiving image data from the another communication device through a primary channel. The communication apparatus controls to shift from the primary channel to a control channel in accordance with the predicted timing when the image data is received in an amount of the error frames on the primary channel from the another communication device.

9 Claims, 10 Drawing Sheets

COMMUNICATION APPARATUS AND CONTROL METHOD THEREOF

This application is a National Stage application under 35 U.S.C. §371 of International Application No. PCT/JP2009/056766, filed on Mar. 25, 2009, which claims priority to Japanese Application No. 2008-098750, filed on Apr. 4, 2008, the contents of each of the foregoing applications being incorporated by reference herein.

TECHNICAL FIELD

The present invention relates to a communication apparatus having communication capability complying with ITU-T Recommendations V.34 and a control method thereof.

BACKGROUND ART (1) [The Spread of IP Networks/IP Telephones]

In recent years, Internet connection services which use ADSL/FTTH have spread in homes and small- to medium-sized offices. Also, in companies and Universities, etc., communization of information processing equipment by LAN and a transition from conventional private lines to VPN (Virtual Private Network: technology to create a private line over the Internet), etc., are planned. Behind such technology, IP networks and IP telephones that use the IP networks are becoming widespread. The IP telephones use technology to send a voice as IP packets (VoIP: Voice over Internet Protocol). Because the IP telephones can execute voice calling over a cheap IP network/router without using expensive equipment such as a switching equipment, a large cost merit is being brought to users who make frequent long-distance calls.

(2) [The Increase of Facsimile Communication Over an IP Network]

As a background to the development and spread of the IP networks and IP telephones, in homes and of course also in companies, the number of facsimile terminals connected to an IP network is increasing, and facsimile communication over an IP network is increasing.

FIG. 1 is a diagram describing a connection between a general public switched telephone network, the Internet, and an IP network/IP telephone.

A communication path 100 indicates facsimile communication which traverses only a telephone station and a public switched telephone network. A communication path 101 connects a facsimile 103 with an ISP (Internet Service Provider) 108 via a VoIP router 107, and indicates a communication path which executes facsimile communication which passes through the Internet 109. Also, a facsimile 105 is connected to an IP network 111 such as a company private line or a VPN, etc., via a VoIP router 110, and it is possible to execute facsimile communication connecting to the public switched telephone network 113 through a VoIP gateway 112 (communication path 104). Also, a communication path 106 indicates transmission between facsimiles connected in the IP network 111. With these various connection configurations, facsimile communication through the IP network 111 can be realized.

(3) [Problems with Facsimile Communication Through an IP Network]

In facsimile communication over a conventional public switched telephone network, interruption of communication rarely occurred because the necessary band for communication over the transfer path was guaranteed. However, as facsimile communication over an IP network increases with the spread of IP network, these communication interruptions during facsimile communication will gradually increase.

In facsimile communication through an IP network, facsimile signals are divided into packets of audio signals and transferred, and on the receiving side, those packets are reassembled and the facsimile signal is obtained by assembling and decoding the audio signal. Because there is no guarantee of communication time in the IP network, and also because when the IP network is congested a band for an audio signal and a band for other data communication cannot sufficiently be taken, a line interruption due to loss of a frequency band or packet delay/loss can occur. With high communication volume, particularly when clumps occur during time periods when data communication is concentrated, such a line interruption can easily occur in an internal company network and the like.

(4) [The Cause for Degradation of Audio Quality in an IP Network]

Before an audio signal from a sending device arrives in a receiving device, A/D conversion, encoding, and packetizing are executed on the signal in the VoIP router (or the VoIP gateway between the public switched phone network and the IP network). Then, in the router in the IP network, routing relay/transfer is executed, and the audio signal is restored by executing packet assembly, decoding and D/A conversion in the VoIP router (or VoIP gateway) on the receiving side.

At this time, the communication speed of packets transferred in the IP network is not constant. For this reason, for a plurality of transferred packets, there is a difference in the timing at which each packet arrives at the VoIP on the receiving side due to network congestion and interruption of the IP network.

FIG. 2 is a diagram illustrating an example of differences in packet arrival timing and packet loss during communication over an IP network.

FIG. 2 illustrates an example of packets sent from a facsimile 201 at constant intervals through a VoIP router being received by a facsimile 202 over an IP network 203. In this manner, if the difference in arrival timing of each packet is large and packet loss occurs in the IP network 203, a phenomenon that a signal wave sampled by the VoIP router on the sending side cannot be restored occurs. This has the effect of instantaneous interruption (temporary loss of audio signal) in the audio signal played back based on the received packets.

(5) [Effects of Degradation of Audio Quality on Facsimile Communication]

Instantaneous interruption of an audio signal caused by a difference in packet arrival timing or packet loss has an effect on facsimile communication. Facsimile communication is a communication method which executes a repetition of procedure transfer and image data transfer while establishing synchronization between the modem on the sending side and the modem on the receiving side. In a communication method in which such synchronization between the sending side and receiving side is necessary, a lack of a communication signal due to the instantaneous interruption causes loss of modem synchronization, and makes it difficult to maintain a procedure signal transmission state or continue communication of image data. In particular, when executing facsimile communication on a modem complying with ITU-T Recommendations V.34, occurrence of the instantaneous interruption has a large effect.

FIG. 3 is a diagram describing a time sequence of a process in which a facsimile communication ends with an error on the receiving side from the appearance of sending/receiving signals in the case of occurrence of instantaneous interruption of an audio signal due to an effect from an IP network during communication with a V.34 modem.

Because image data of V.34 communication is composed of continuous frames, if an instantaneous interruption occurs during reception of an image signal, image data of a frame cannot be received during the time from loss of synchronization of frame communication until resynchronization. Also, processing for resynchronization is complicated, and if an instantaneous interruption of a line signal longer than a certain amount of time period occurs, resynchronization is impossible, and as the modems diverge, normal reception of image data becomes impossible.

In order to solve such a problem, Japanese Patent Laid-Open No. 04-255166 discloses technology to, if an error frame is detected and a valid frame cannot be received within a certain time period until the next correct frame is received, shift to a low-speed procedure and receive a low-speed command from the other side.

However, in the conventional technology, if an instantaneous interruption occurs again when an error frame is being resent, the modems diverge, and it becomes impossible to recognize the rear end of a primary channel on the receiving side. The rear end of a primary channel indicates a control signal for shift a communication channel from a primary channel for executing reception of image data to a control channel for executing transmission/reception of a sequence signal. In such a case, when the receiving side determines that a certain amount of time period has passed in a state in which the rear end of a primary channel has not been detected, a timeout error occurs and the process terminates with an error.

DISCLOSURE OF INVENTION

An aspect of the present invention is to eliminate the above-mentioned problems with the conventional technology.

According to an aspect of the present invention, while receiving image data of an error frame from another communication apparatus through a V.34 primary channel, when an instantaneous interruption of the signal occurs due to the IP network, a shift from the primary channel to a control channel is appropriately executed.

According to an aspect of the present invention, there is provided a communication apparatus for executing communication complying with ITU-T Recommendations V.34, the apparatus comprising: calculation means for calculating the number of error frames which are not normally received when receiving image data from another communication device through a primary channel; prediction means for predicting a timing at which reception of image data for the number of the error frames sent by the another communication device is terminated, based on the number of the error frames calculated by the calculation means; and control means for shifting from the primary channel to a control channel in accordance with the timing predicted by the prediction means in a case that the image data for the number of the error frames is received on the primary channel.

According to an aspect of the present invention, there is provided a control method of a communication apparatus for executing communication complying with ITU-T Recommendations V.34, the method comprising: a calculation step of calculating the number of error frames which are not normally received when image data is received from another communication device on a primary channel; a prediction step of predicting a timing at which reception of image data in an amount of the error frames sent from the another communication device is terminated, based on the number of error frames calculated in the calculation step; and a control step of controlling to shift from the primary channel to a control channel in accordance with the timing predicted in the prediction step when the image data is received in an amount of the error frames on the primary channel.

Further features of the present invention will become apparent from the following description of exemplary embodiments, with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

The present embodiment relates to a communication apparatus which complies with the ITU-T (International Telecommunication Union-Telecommunication Standardization Sector) V.34 recommendation. When a facsimile, which is an example of a communication apparatus complying with this, executes communication, even in a case where line interruption or the like occurs and continuous communication is difficult because modem synchronization is lost, a communication apparatus which can continuously communicate, and a control method thereof will be explained. In particular, processing when an instantaneous interruption occurs during transmission/reception of a primary channel and control channel, and technology to transmit a large amount of data at high resolution in an environment in which line disturbances occur frequently will be described.

First Embodiment

Hereinafter, the first embodiment of the present invention will be explained in detail with reference to FIG. 4 through FIG. 6.

Figure 1:
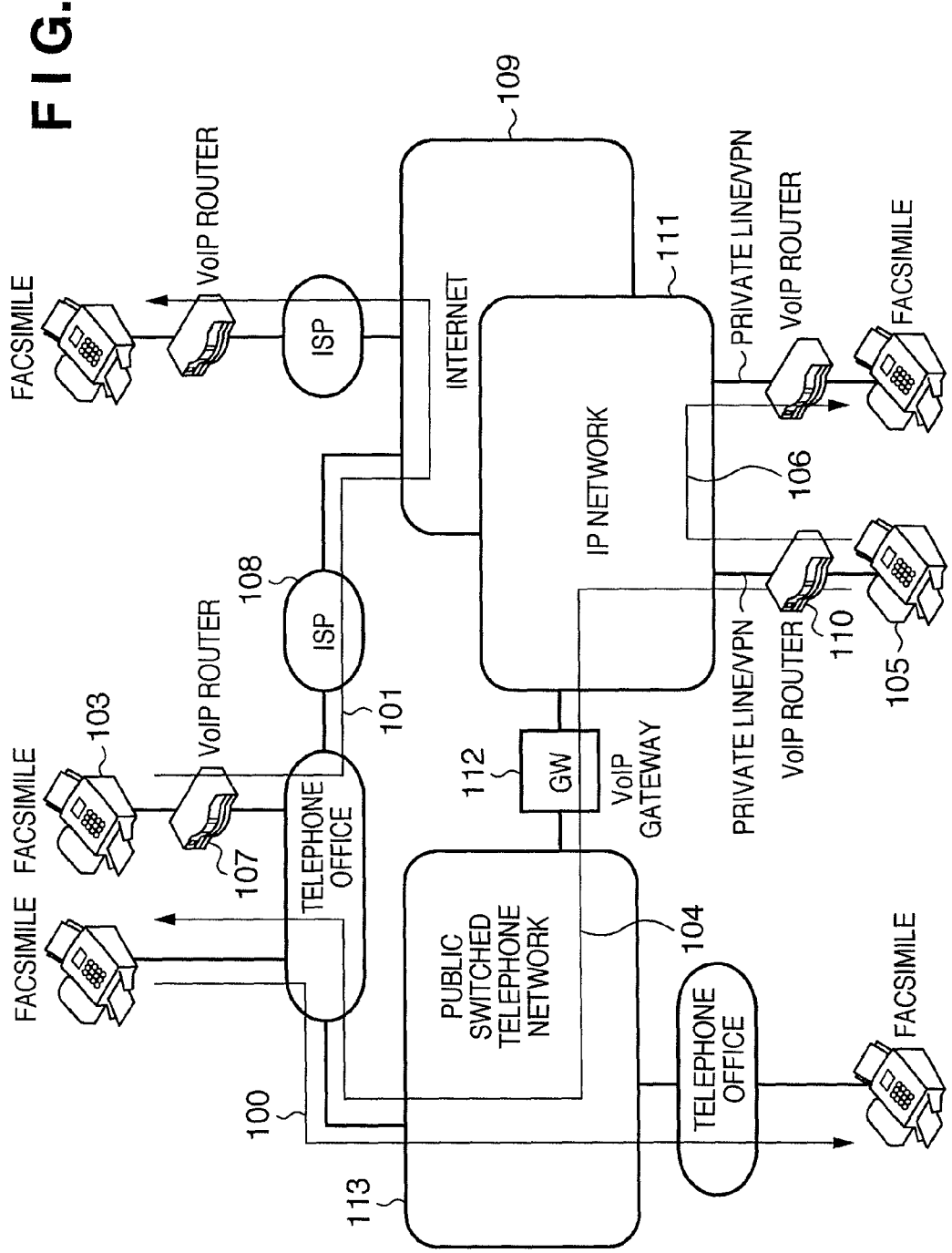
FIG. 1 is a diagram describing a connection between a general public switched telephone network, the Internet, and an IP network/IP telephone.
Figure 2:
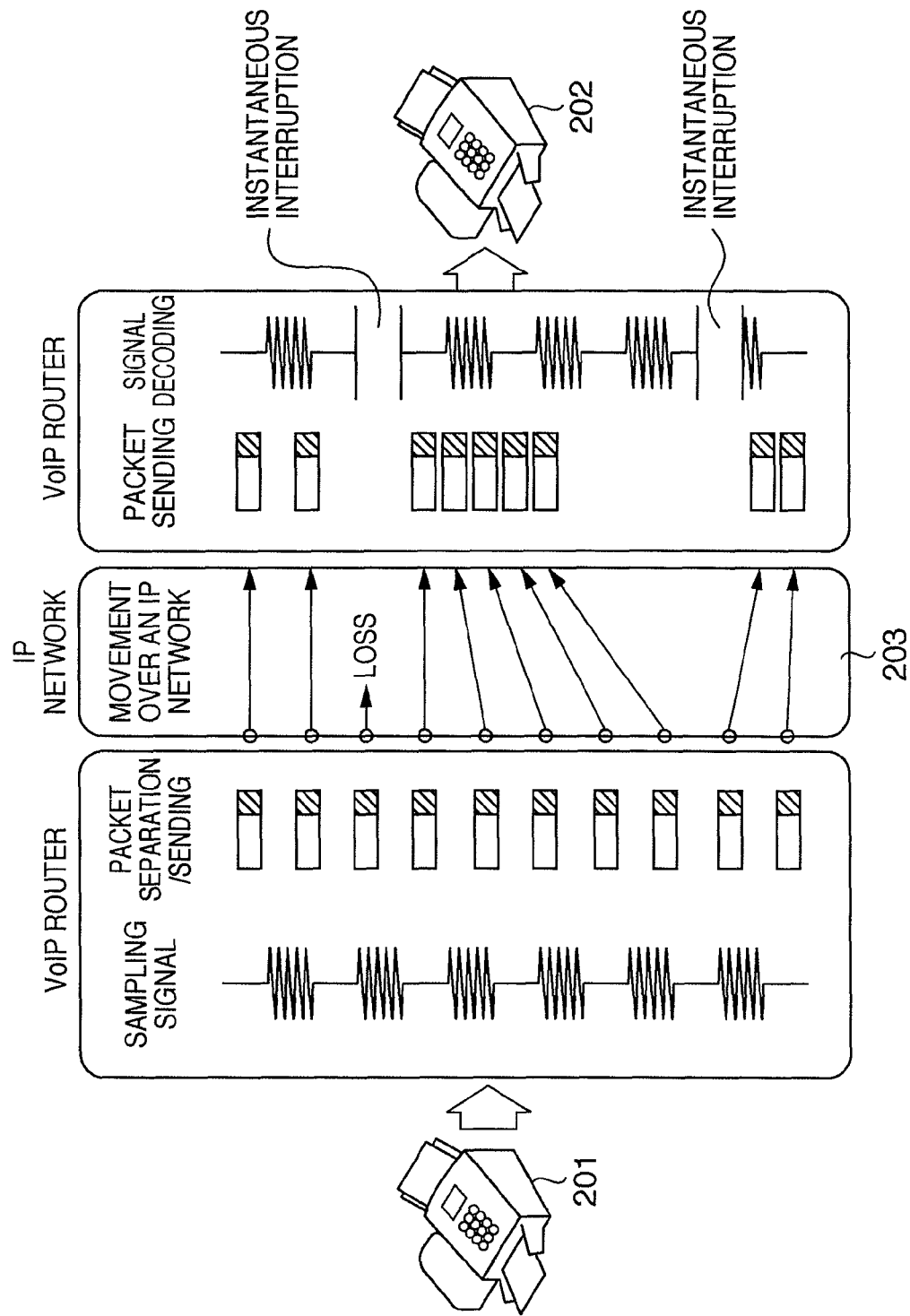
FIG. 2 is a diagram describing an example of fluctuation of packet reception and packet loss during communication through an IP network.
Figure 3:
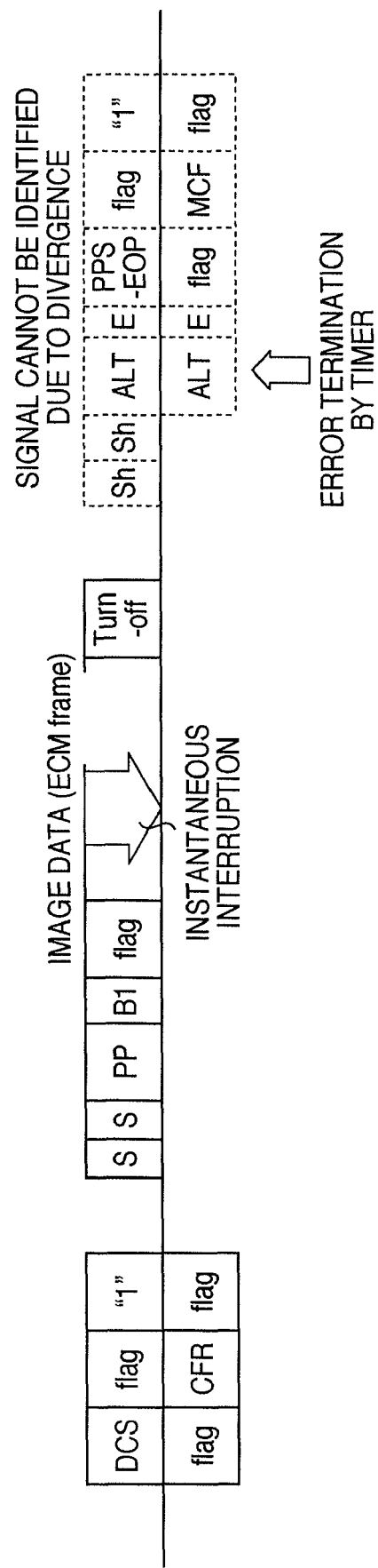
FIG. 3 is a diagram describing a time sequence of a process in which a facsimile communication terminates due to an error on the receiving side from the appearance of sending/receiving signals in the case of occurrence of instantaneous interruption of an audio signal due to an effect from an IP network during communication with a V.34 modem.
Figure 4:
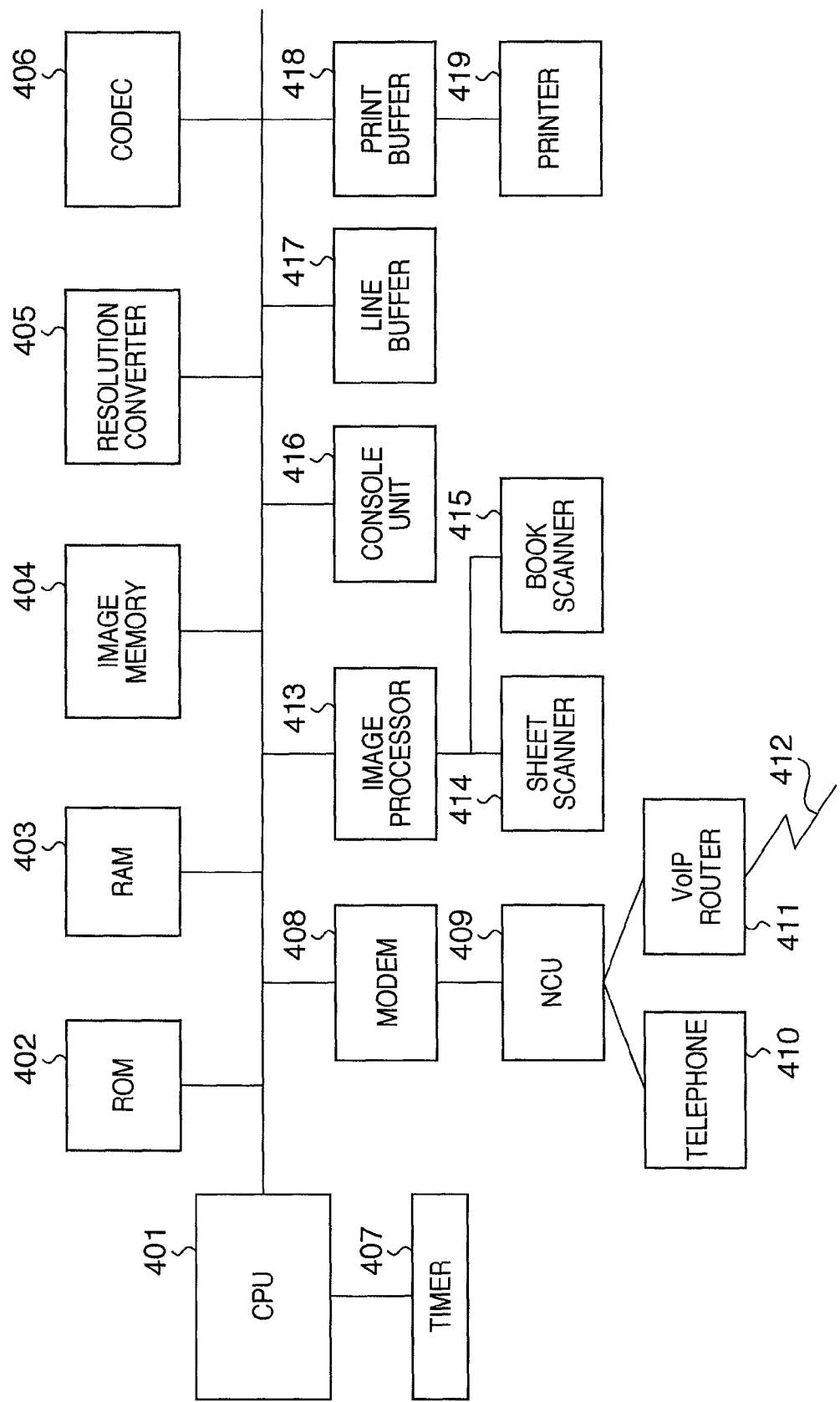
FIG. 4 is a block diagram illustrating a composition of a communication apparatus according to the first embodiment of the present invention.

FIG. 4 is a block diagram illustrating a composition of the communication apparatus according to the first embodiment of the present invention.

A CPU 401 controls the operation of this communication apparatus in accordance with a program stored in a ROM 402. The ROM 402 stores a control program executed by the CPU 401 and several types of data. The RAM 403 is composed of an SRAM or the like, and in addition to providing a work area for execution of processes by the CPU 401, is used to temporarily store image data, etc. An image memory 404 is composed of DRAM or the like, and accumulates scanned image data or image data received through a network, etc. A resolution converter 405 executes resolution conversion of image data from millimeters to inches, etc. An encoder/decoder (codec) 406 encodes image data to be used by the communication apparatus, and decodes encoded image data. A timer 407 measures time intervals, etc., under an instruction of the CPU 401, and is composed of, for example, a programmable timer which gives notification by an interrupt or the like to the CPU 401 when a designated time period has elapsed.

A modem 408 demodulates a modulated signal input from a network through an NCU 409, and on the other hand, modulates signals and sends the modulated signals to the network through the NCU 409. The NCU 409 connects to a telephone 410, and controls communication with a VoIP router 411. The telephone 410 is a handset connected to a telephone line (telephone without a dialer) or an external telephone (answering machine, etc.). In the case that the telephone 410 has two connection terminals, each connection terminal has a detection circuit for detecting whether each terminal is on-hook or off-hook. The VoIP router 411 connects to an IP network 412 such as a VPN and this communication apparatus by an analog port.

An image processor 413 executes correction processing of image data read out from a scanner 414 or 415, and outputs it. A sheet scanner 414 and book scanner 415 have a CS image sensor, document feed mechanism, etc., and optically readout an original, convert it to electronic image data, and output it. Also, the scanners 414 and 415 can execute double-sided readout of an original. A console unit 416 has a keyboard, display unit and the like, and inputs operation commands from an operator. Moreover, the display unit displays that dialing operation is immediately possible when the telephone 410 handset is off-hook, and also displays a status of in-communication and that communication reservation is possible when an external telephone is off-hook.

A line buffer 417 stores each set of scan line data (raster data) of image data, and is used when executing transfer control in units of each line. A print buffer 418 is a buffer memory for one page which stores data for printing. A printer 419 is a printer such as, for example, LBP or the like, which prints received image data via the network or image data readout by the scanner 4141 or 415, and is capable of double-sided printing.

Figure 5:
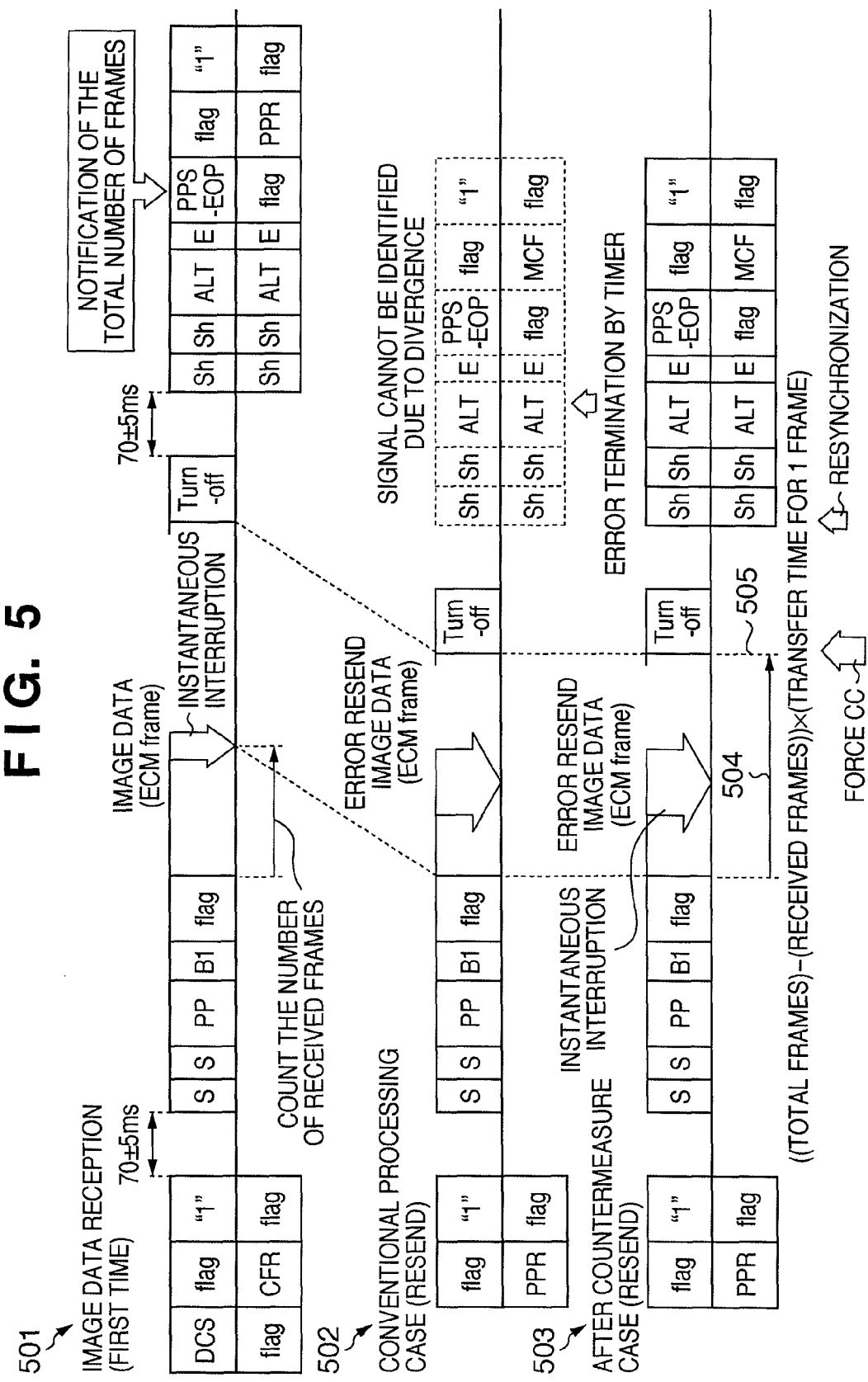
FIG. 5 is a sequence diagram describing an example of avoiding line disturbance according to the first embodiment of the present invention.

FIG. 5 is a sequence diagram describing specific examples of avoiding line disturbance according to the embodiment of the present invention.

Reference numeral 501 illustrates sequences of sending side and receiving side in the case that a line disturbance occurs during receiving primary channel (PC) and an instantaneous interruption occurs. A primary channel is a communication mode for transmitting/receiving image data between a sending side and a receiving side. Moreover, hereinafter, the communication apparatus illustrated in FIG. 4 operates as a communication apparatus of a receiving side which receives image data, and other communication apparatuses (not shown) connected from the VoIP router 411 through the IP network 412 operate as a communication apparatuses of sending side (sending origin).

Also, for the following explanation, the communication apparatus in FIG. 4 and other communication apparatuses execute image data transfer using an ECM (Error Correction Mode). An ECM is a communication mode which transmits image data without any missing lines by resending image data lost due to noise on the line, etc. In the ECM, image data is partitioned into units of blocks, and each blocks is separated into frames and each frame is sent from the sending side to the receiving side. On the receiving side, error determination is executed each time a frame is received, and this is repeated until reception of one block is complete. In the case that there is an error frame (a frame which was not received normally) when reception of one block is complete, a resend request for the error frame is given to the sending side. The sending side which receives the resend request resends only the frame for which an error occurred, and starts sending the next block when normal transmission of the image data is confirmed.

Reference numeral 502 is a sequence which illustrates the conventional technology, and as shown in, for example, reference numeral 501, illustrates a state after an error frame has occurred when a communication apparatus receives image data from another communication apparatus over a primary channel. Here, the error frame is being resent, but the modems have diverged due to a second occurrence of an instantaneous interruption, and a state in which a control signal (RCP signal) which indicates the rear end of a primary channel cannot be recognized by the receiving side. Therefore, in such a case, the receiving side generates a timeout and terminates with an error because a certain amount of time period measured by a timer has passed.

Reference numeral 503 describes the embodiment according to the present invention. Here, a state after an error frame such as that shown in, for example, reference numeral 501 has occurred when a communication apparatus receives image data from another communication apparatus is also illustrated. With respect to this, in the present embodiment, on the primary channel, the amount of elapsed time period 504 until reception of image data in the amount of error frames sent from another communication apparatus is completed is calculated, and the timing 505 of the rear end of the primary channel is predicted. Then, the modem 408 controls a primary channel to shift to a control channel in accordance with the predicted timing 505, after reception of image data in the amount of error frames is started. Hereinafter, a specific example of this operation will be explained in detail.

Figure 6:
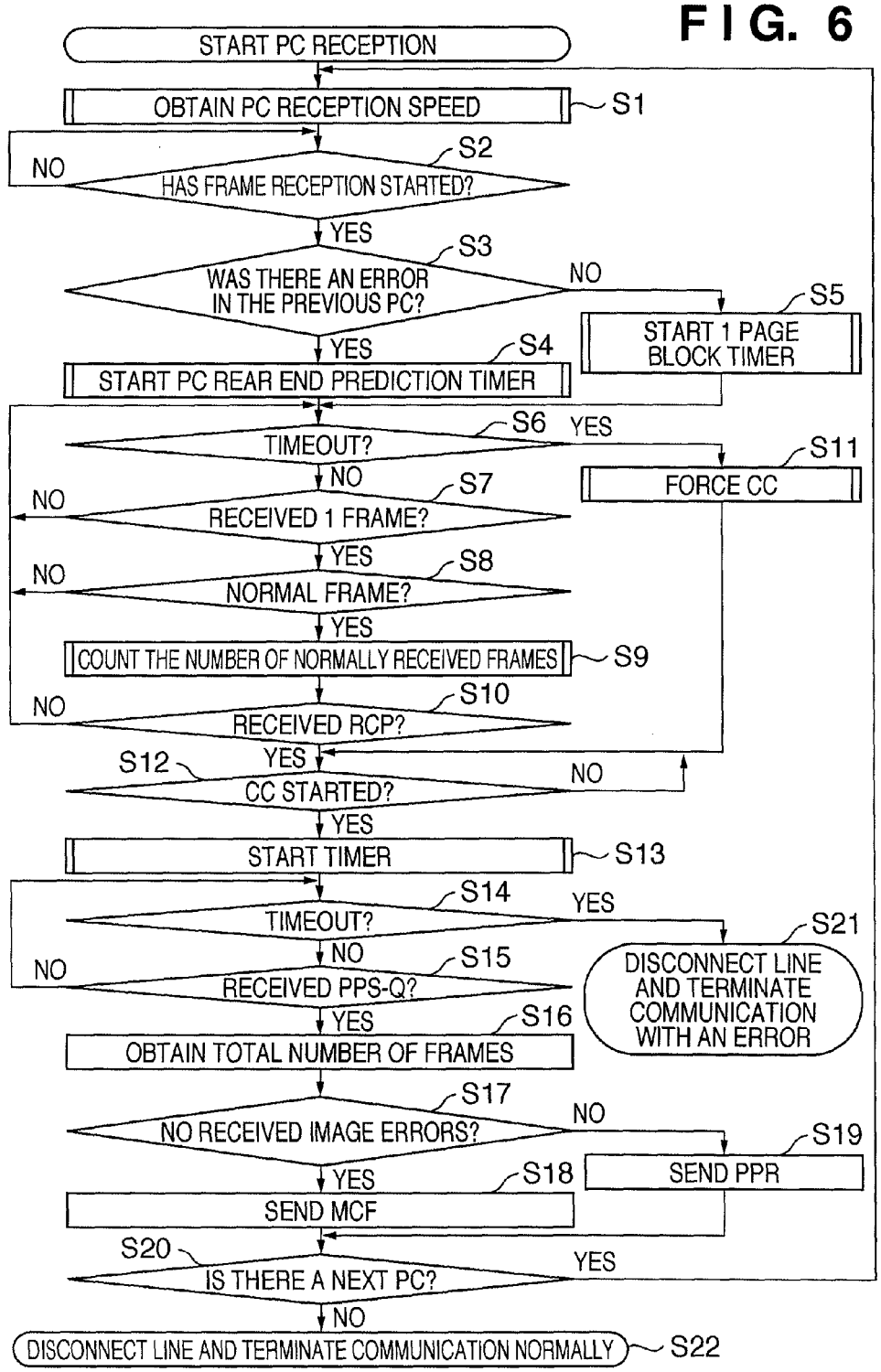
FIG. 6 is a flowchart describing receiving processing of a communication apparatus according to the first embodiment of the present invention.

FIG. 6 is a flowchart describing receiving processing of the communication apparatus according to the first embodiment of the present invention. Here, the rear end of the primary channel is predicted, and processing to force resynchronization with the predicted rear end is executed. Moreover, the program which executes this processing is stored in the ROM 402, and is executed under the control of the CPU 401.

This processing is started when there is a shift to reception processing of the primary channel through phases 1 to 5 of V.34 with the other sending device (other device) after the arrival of the primary channel. First, in step S1, communication speed information of the primary channel is obtained (obtain communication speed) after the shift to the primary channel. Next, the process proceeds to step S2, a flag is received by resynchronization of the primary channel, and reception of a frame of image data is subsequently awaited. The process proceeds to step S3 in which frame reception is started, and it is determined whether or not there was a frame which could not be normally received (error frame) during the previous primary channel reception. If it is determined that there was an error frame, the process proceeds to step S4, the rear end of the primary channel is predicted and the timer 407 is activated.

Figure 7:
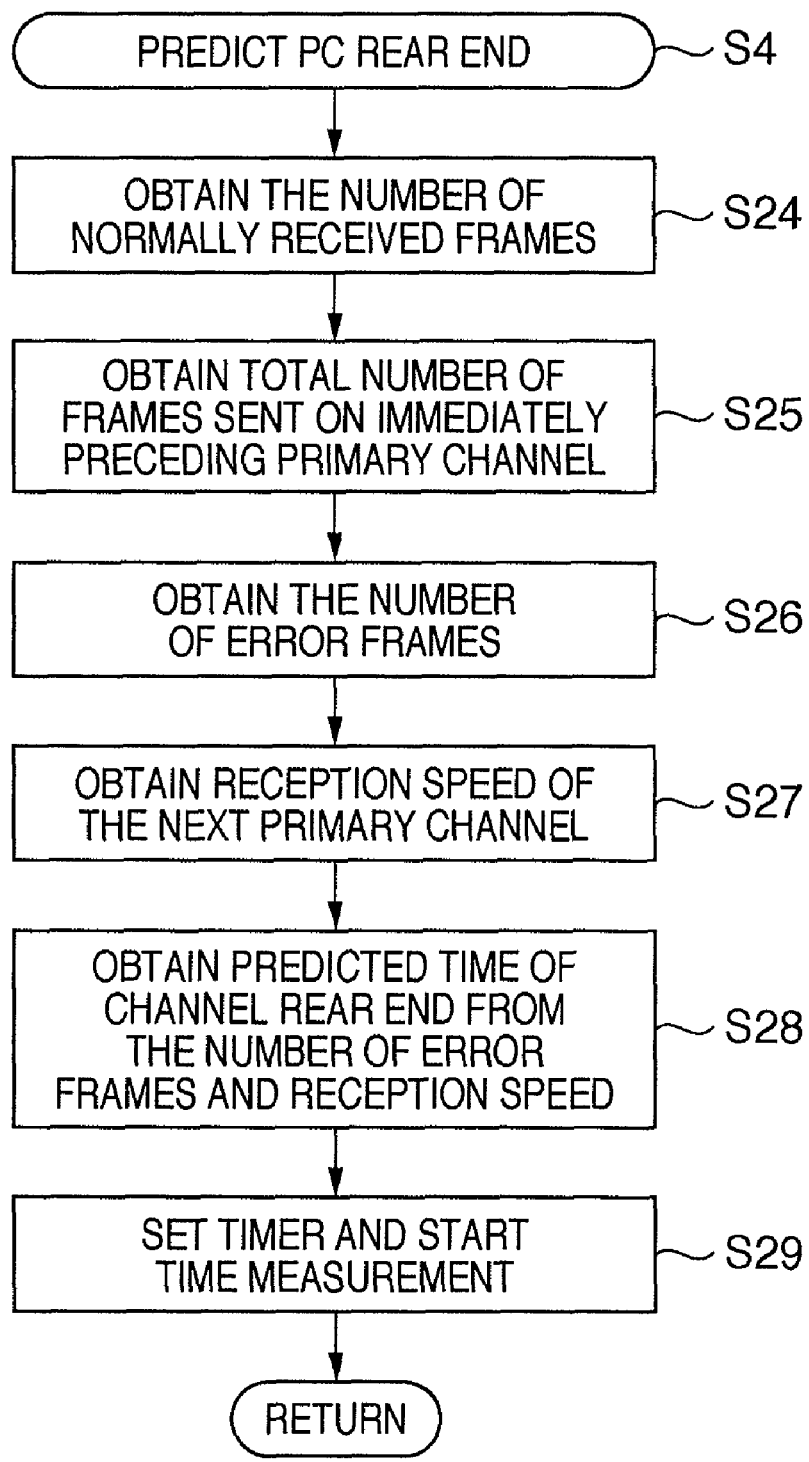
FIG. 7 is a flowchart describing processing of step S4 of FIG. 6.
Figure 8:
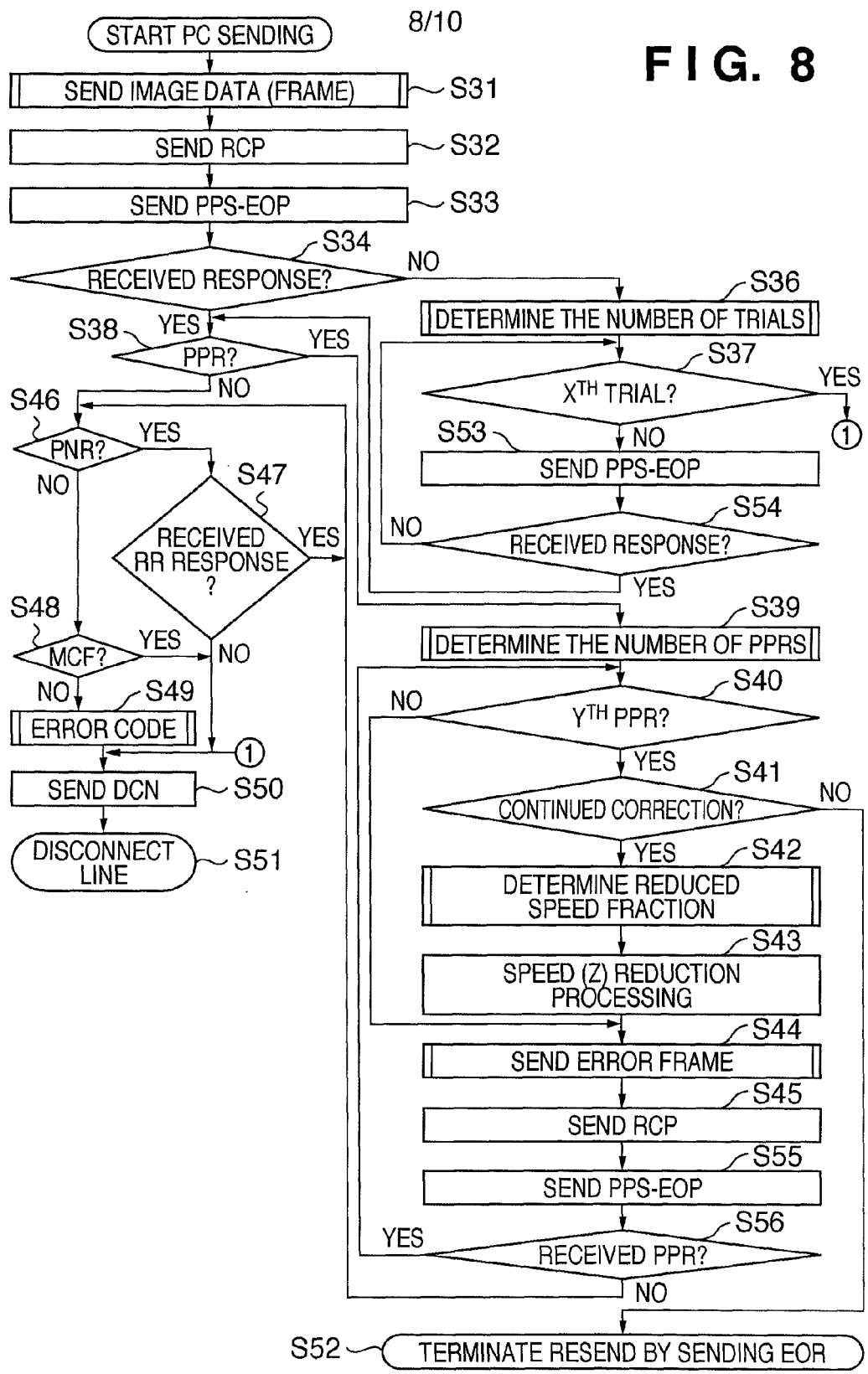
FIG. 8 is a flowchart describing sending processing of a communication apparatus according to the second embodiment of the present invention.

FIG. 7 is a flowchart describing the primary channel rear end calculation processing of step S4 in FIG. 6. Processing of step S4 will be explained with reference to this FIG. 7.

First, in step S24, the number of normally received normal frames for the immediately preceding primary channel reception is obtained. Next, the process proceeds to step S25, and the number of total frames sent by the sending device is obtained (obtain total number of frames) for the immediately preceding primary channel reception. Next, the process proceeds to step S26, and the number of frames that were resent due to an error is obtained by subtracting the number of normally received frames from the total number of frames. Next, the process proceeds to step S27, and the reception speed for the following primary channel is obtained. Then in step S28, the amount of time period 504 (FIG. 5) until the rear end of the resent primary channel reception is predicted based on the number of resent error frames and the primary channel reception speed. Then the process proceeds to step S29, the predicted time period is set in the timer 407 and time measurement is started. Thus, in the step S6 of FIG. 6, when reception of one frame is not complete even after the time period passes, it is possible to forcefully shift the sending device from the primary channel to a control channel at a primary channel reception rear end timing 505 (FIG. 5) in step S11.

Next, returning again to FIG. 6, if it is determined in step S3 that there was no error frame, then the process proceeds to step S5, a time corresponding to one block of an ECM which has the largest data length which can be communicated over the primary channel is set in the timer 407 and time measurement is started. More specifically, for example, as shown in FIG. 5, the number of received frames is subtracted from the total number of frames to obtain the difference value, and by multiplying the difference value with the transfer time for one frame, the time at which reception of the block will finally be complete is predicted and set in the timer 407. After step S4 or step S5 is thus executed, the process proceeds to step S6. The processing of steps S6 through S10 is reception loop processing of the primary channel.

In step S6, it is determined whether or not a timeout is occurred by the timer 407. If the timeout has occurred, the process proceeds to step S11, and a shift to the control channel is forced. On the other hand, if the timeout has not occurred in step S6, the process proceeds to step S7, and it is determined whether or not one frame of data is received. Here, if one frame is not received, then the process returns to step S6. If one frame is received, then the process proceeds to step S8, and it is determined whether or not the received frame is normal (no error). Here, in the case that there is an error, the error frame is discarded and the process returns to step S6. On the other hand, if the received frame is normal, the process proceeds from step S8 to step S9, and a counter (set in the RAM 403) which counts the number of normally received frames is incremented and the process proceeds to step S10. In step S10, it is determined whether or not an RCP signal which indicates the rear end of the primary channel is received. In the case that an RCP signal is not received, the process returns to step S6, and the aforementioned processing is repeated.

In step S10, when an RCP signal is received, the process proceeds to step S12, primary channel reception processing is stopped and the timing of the start of the control channel (CC) is awaited. When control channel reception is started the process proceeds to step S13, a time period (T2) which measures a time period for waiting a procedure signal is set in the timer 407 and time measurement is started. Next, in steps S14 and S15, a signal from the sending device is awaited. In step S14, it is determined whether or not the procedure signal is received within the time period T2, and if the procedure signal is not received within the time period T2, then the process proceeds to step S21, the line is disconnected and communication terminates with an error.

In steps S14 and S15, if the procedure signal (PPS-Q) is received within the time period T2, then the process proceeds to step S16, and the total number of frames included in the PPS signal is obtained. Then, the process proceeds to step S17, and it is determined whether or not there is no error in all the frames received on the primary channel. In the case that there is no error, the process proceeds to step S18, an MCF is sent and the sending device is notified that there is no error in the received data. On the other hand, in the case that it is determined that there is an error in step S17, the process proceeds to step S19, a partial page request signal (PPR) is sent to the sending device, and the sending device is notified of number information of the error frame to be resent. After step S18 or step S19 is thus executed, the process proceeds to step S20, and it is determined whether there is a primary channel reception following the received PPS-Q signal and received frame (next page or error frame resend). In the case that there is a next primary channel reception, the process returns to step S1, and the primary channel reception processing is repeated. On the other hand, in the case that there is no next primary channel reception, the process proceeds to step S22, the line is disconnected and communication is terminated normally.

Thus, according to the first embodiment, if an error occurs during the primary channel reception, the number of error frames is calculated from the total number of sent frames in the immediately preceding primary channel and the number of normally received frames. Then, in accordance with the multiplication result of the number of error frames and the reception speed of one frame, the transfer time for the error resend frame is calculated, and the rear end of the primary channel reception is predicted. Resynchronization can be executed by forcing a shift to the control channel reception at the rear end timing thus predicted.

Moreover, in the description above, the communication apparatus shown in FIG. 4 communicates with another communication apparatus connected to the VoIP router 411 through the IP network 412. Here, the communication apparatus of FIG. 4 may be able to communicate through the NCU 409 with other communication apparatuses over a telephone line (not through the IP network 412). In this case, the NCU 409 of the communication apparatus in FIG. 4 may have a function to detect whether communication with another communication apparatus passes through the IP network or not. In the case of communication that does not go through the IP network, calculation of a rear end of the primary channel is unnecessary. Here, in the case that the NCU 409 detects a communication through the IP network, the modem 408 controls to execute such that the flow shown in FIG. 6 is executed. On the other hand, in the case that the NCU 409 detects a communication not through the IP network, the modem 408 controls to execute such that each step excluding steps S4, S6 and S11 in the flow shown in FIG. 6 is executed. In other words, in the case that the NCU 409 detects a communication not through the IP network 412, the modem 408 controls to shift to the control channel by reception of an RCP signal which indicates the rear end of the primary channel.

Second Embodiment

Hereinafter, the second embodiment of the present invention will be described in detail with reference to FIG. 8 through FIG. 12. Moreover, because the hardware composition of the communication apparatus according to this second embodiment is the same composition as that of the aforementioned communication apparatus according to the first embodiment, an explanation thereof will be omitted.

FIG. 8, FIG. 9, FIG. 10, and FIG. 11 are flowcharts describing sending processing for the communication apparatus according to the second embodiment of the present invention. Here, a change in the number of resend commands and fallback processing upon post-procedure processing are described, in the case that there is no next page after sending image data on a primary channel (PC). Moreover, the program which executes the processing is stored in the ROM 402, and executed under the control of the CPU 401. The processing is launched by shifting to the primary channel sending processing through phases 1 to 5 of V.34 with the receiving device (other device) after a call request from a communication apparatus which is a sending device.

First, in step S31, image data is sent over the primary channel in units of ECM frames. After then, the process proceeds to step S32, and an RCP signal which indicates completion of data transmission over the primary channel is sent. Then the process proceeds to step S33, communication is shifted from the primary channel to the control channel, and a PPS-EOP which is a post-procedure signal is sent. Next, the process proceeds to step S34, and a response from the receiving device is awaited for, for example, 3 seconds. Here, in the case that there is no response within 3 seconds, the process proceeds to step S36, and the number of command resends (X) is determined.

Figure 9:
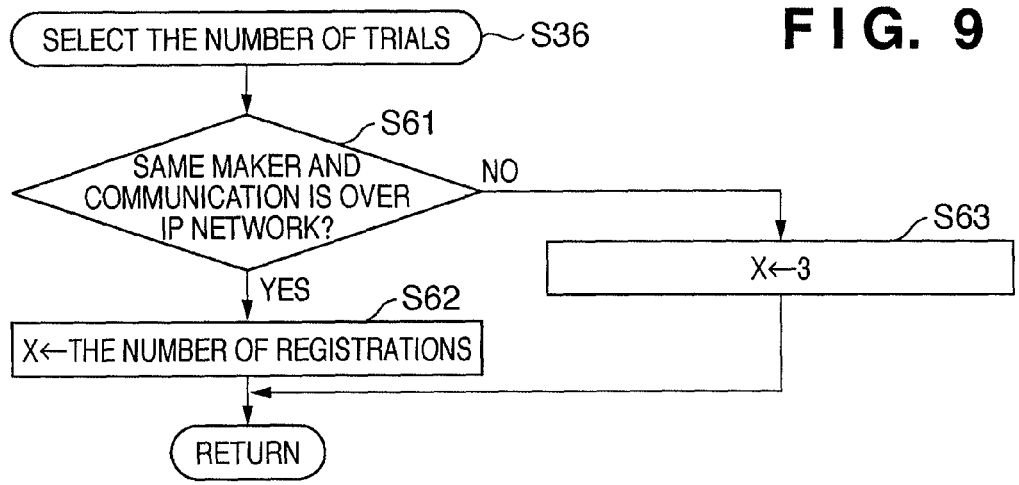
FIG. 9 is a flowchart describing processing which determines the number of times to resend a command in step S36 of FIG. 8.

FIG. 9 is a flowchart describing processing to determine the number of command resends in step S36. The processing of step S36 will be explained with reference to this FIG. 9.

First, in step S61, in the case that an initialization identification signal or a command reception signal is received in a facsimile procedure, a maker code included in a non-standard function signal is obtained, and it is confirmed whether or not the communication is over the IP network. Then, if it is determined in step S61 that the obtained maker code matches the device's own code and the communication is over the IP network, the process proceeds to step S62, and a trial number of times is set to an arbitrary number of times registered in advance ("3" or more is preferable). In other cases the process proceeds from step S61 to step S63, and three times is set as specified in the ITU-T Recommendations.

When the number of times X is thus determined in step S36, the process proceeds to step S37, it is determined whether or not the PPS-EOP signal has been sent the number of prescribed times (here, X), and if the number of resends has not reached X times, the process proceeds to step S53, and the PPS-EOP signal is sent. Then the process proceeds to step S54, it is determined whether or not there is a response from the receiving device. If there is no response in step S54, the process proceeds to step S37 and it is determined whether or not X resends have been done. In step S37, if X resends have been done, the process proceeds from step S37 to step S50 and a DCN signal is sent. Then, in step S51, the line is disconnected and the processing is terminated. On the other hand, if there is a response from the receiving device in step S54, then the process proceeds to step S38.

In step S34 or step S54, if there is a response from the receiving device, then the process proceeds to step S38, and it is determined whether or not a PPR signal was received from the receiving device. In the case that the PPR signal was received, the process proceeds to step S39, and the number of times of PPR reception for fallback (communication speed reduction processing) is determined.

Figure 10:
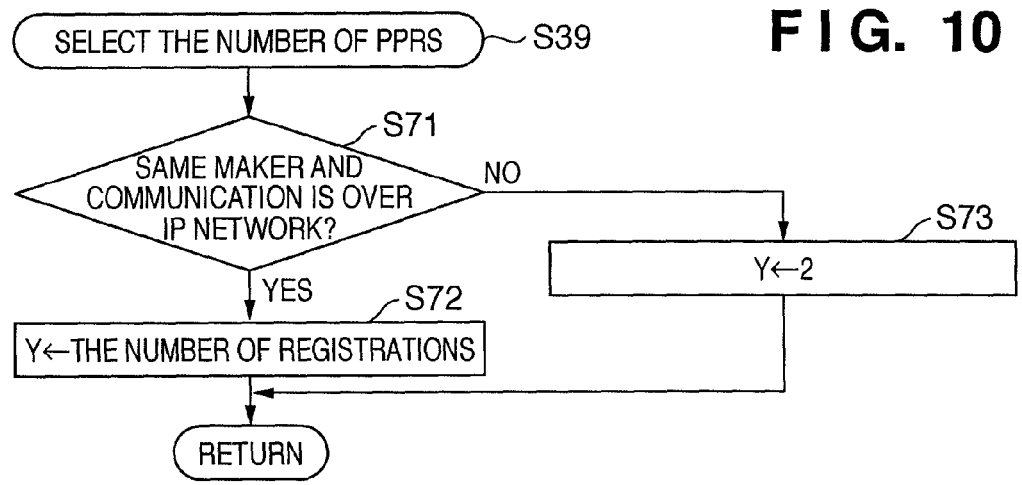
FIG. 10 is a flowchart describing processing which determines the number of times to receive a PPR in step S39 of FIG. 8.

FIG. 10 is a flowchart describing processing to determine the number of times of PPR reception in step S39. Processing of step S39 will be explained with reference to this FIG. 10.

First, in step S71, in the case that an initialization identification signal is received in a pre-procedure, a maker code included in a non-standard function signal is obtained, and it is confirmed whether or not communication is through the IP network. In step S71, if it is determined that the maker code matches the device's own code and the communication is over the IP network, then the process proceeds to step S72. In step S72, the number of PPR receptions for fallback is set to an arbitrary number of times Y registered in advance ("2" is preferable). In other cases the process advances to step S73, and two times (Y=2) is set.

When the number of times Y is thus set in step S39, the process proceeds to step S40, and it is determined whether or not PPR has been received Y times. Here, in the case that reception has been done Y times, the process proceeds to step S41, and it is determined whether or not fallback is possible. Here, if the fallback is not possible, then the process proceeds to step S52, EOR sending processing is executed and resending is terminated.

On the other hand, in step S41, if it is determined that the fallback is possible, then the process proceeds to step S42, and a fallback reduced speed is determined.

Figure 11:
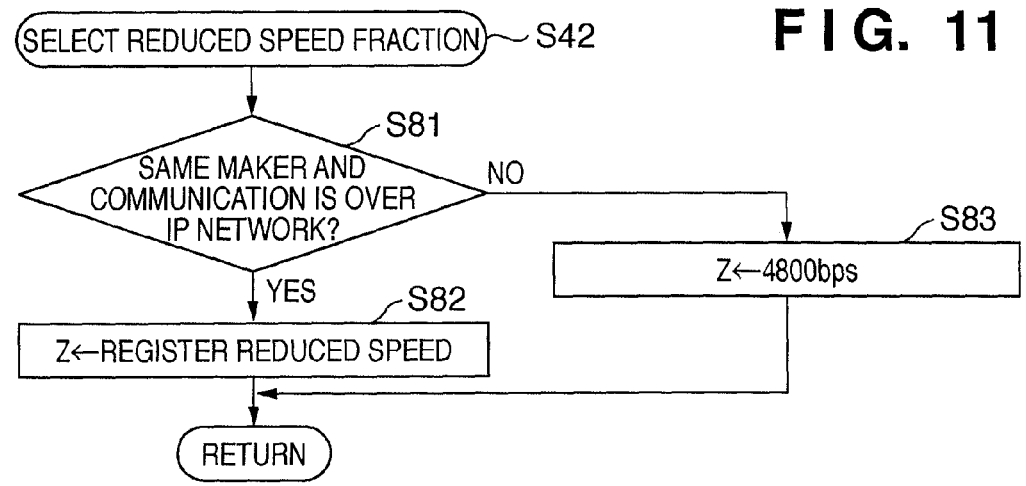
FIG. 11 is a flowchart describing processing which determines a fallback reduced speed in step S42 of FIG. 8.

FIG. 11 is a flowchart describing processing which determines the fallback reduced speed of step S42. Processing of step S42 will be explained with reference to FIG. 11.

First, in step S81, in the case that an initialization identification signal is received in a pre-procedure, a maker code included in a non-standard function signal is obtained, and it is confirmed whether or not communication is through the IP network. Here, in the case that the maker code matches and the communication is over the IP network, the process proceeds to step S82, and the reduced speed for fallback is determined to be a reduced speed Z registered in advance. In other cases the process proceeds to step S83, and the reduced speed Z is determined to be the conventional 4800 bps.

When the fallback reduced speed Z is thus determined in step S42, the process proceeds to step S43, and the reduced speed of the determined Z bps is subtracted from the sending speed of the previous primary channel and the subtracted result is set to the modem 408 so as to execute communication. Next, the process proceeds to step S44, and after resending of the error frame indicated by the received PPR signal, in step S45, an RCP signal indicating completion of data sending over the primary channel is sent and the process proceeds to step S55. In step S55, a PPS-EOP is sent. Then, in step S56, it is determined whether or not the PPR signal was received from the receiving device. If it is determined that the PPR signal has been received, the process proceeds to step S40, but if not the process proceeds to step S46.

On the other hand, if it is determined in step S38 that the PPR signal has not been received from the receiving device, then the process proceeds to step S46. It is determined in step S46 whether or not the signal received in step S34 is an RNR signal. If so, the process proceeds to step S47. In step S47, because the received data cannot be decoded, an RR signal is sent and a response is awaited. Here, if there is no response to the RR signal, then the process proceeds to step S50, a DCN signal is sent, the line is disconnected and communication is terminated. On the other hand, in step S47, if the response to the RR signal is received, then the process proceeds to step S46.

Furthermore, if it is determined in step S46 that an RNR signal has not been received, then the process proceeds to step S48 and it is determined whether or not an MCF signal has been received. Here, if it is determined that the MCF signal has been received, the process proceeds to step S50, a DCN signal is sent, and the line is disconnected and communication is terminated. In the case of another signal, the process proceeds from step S48 to step S49, and an error code is set and the process proceeds to step S50. In step S50, a DCN signal is sent, and the line is disconnected and communication is terminated.

Figure 12:
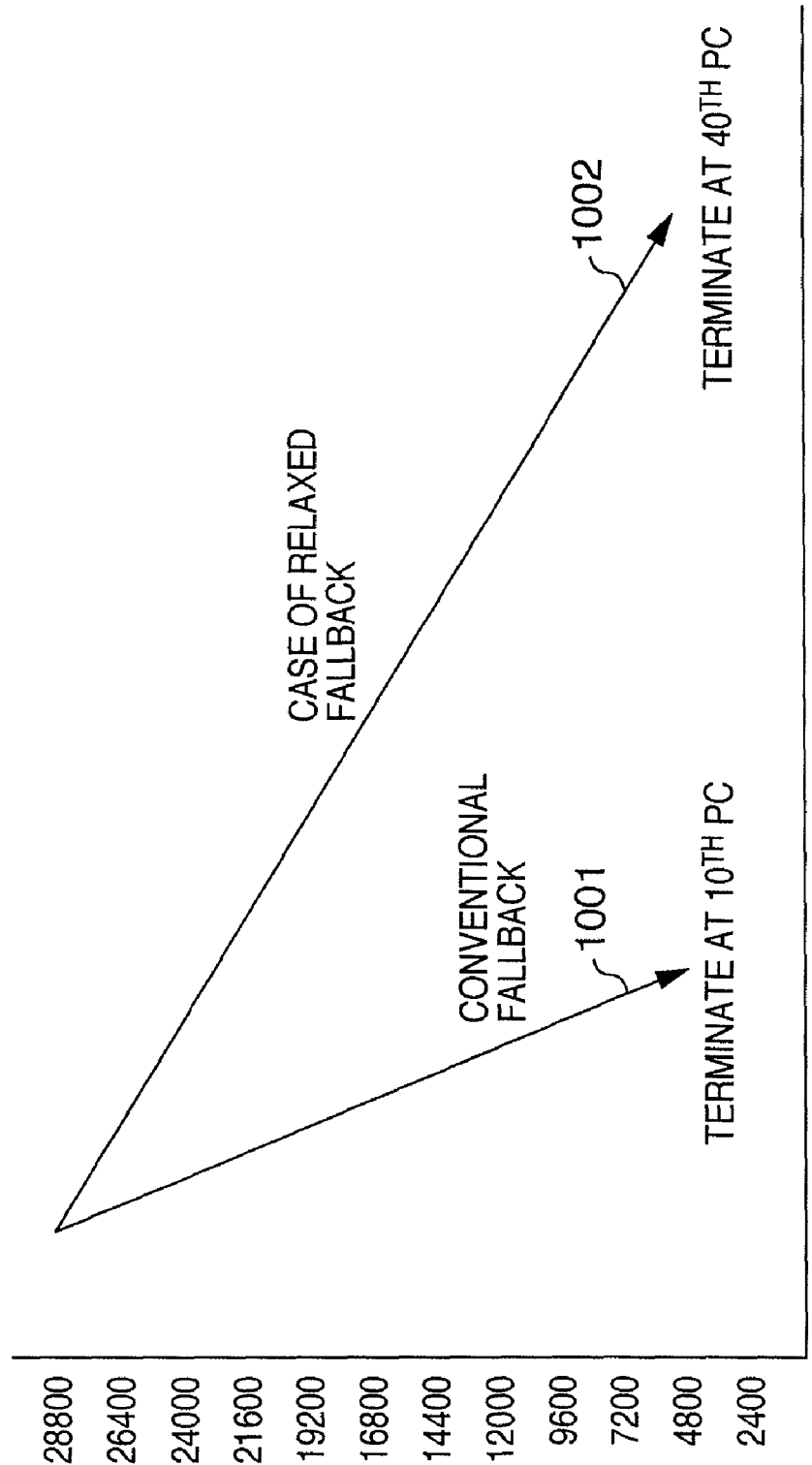
FIG. 12 is a diagram comparing a case in which fallback processing has been executed according to the second embodiment with conventional processing.

FIG. 12 is a diagram illustrating a comparison example of processing in the case that the maker codes explained with reference to the aforementioned FIG. 8 through FIG. 11 match, and the communication is over the IP network.

Reference numeral 1001 denotes that the primary channel can be used a maximum of 10 times in the conventional case that the number of times of fallback PPR reception is two times, and the reduced speed is 4800 bps.

Also, reference numeral 1002 denotes a case in which the number of times of fallback PPR reception is changed from two times to four times, and the fallback speed is changed from 4800 bps to 2400 bps. Then, by this, it can be understood that it is possible to use the primary channel 40 times before no further fallback can be done.

By thus comparing the case of reference numeral 1001 with the case of reference numeral 1002, starting at 28800 bps, in the case of simply calculating occurrences of line disturbance in each primary channel, in the case of reference numeral 1002, it becomes possible to use the primary channel four times as many times.

Moreover, in the aforementioned first and second embodiments, as a detection method for determining whether or not communication is over the IP network, the connection to the IP network may be registered in advance, and reference to this may be made.

Also, as an alternative, communication may be determined to be over the IP network when a calling number is a telephone number beginning with "050".

Also, as an alternative, communication may be determined to be over the IP network when notification of a calling party number (number displayed number) during an incoming call indicates that it is a telephone number beginning with "050".

Also, as an alternative, communication may be determined to be over the IP network when a communication terminal identification signal (TSI) or call request terminal identification signal (CSI) exchanged in a facsimile procedure is a telephone number beginning with "050".

According to the aforementioned embodiment, even in a case that unexpected line disturbance occurs during V. 34 communication, communication error due to modem divergence/carrier cutoff in the primary channel or the control channel can be avoided. Thus, communication can be continued without terminating with an error.

According to the present embodiment, even if the rear end of the primary channel (RCP signal) cannot be detected due to an instantaneous interruption, it is possible to reliably shift to the control channel.

Also, according to the present embodiment, there is an effect that even if line disturbance occurs on the control channel, the chances of recovery are increased and communication can be continued.

Also, according to the present embodiment, the fraction of abrupt termination with an error can be drastically reduced upon communicating a large number of high-resolution pages over a line in which line disturbance is frequent.

Other Embodiments

Moreover, the present invention can also be achieved by directly or remotely supplying a program of software that implements the functions of the aforementioned embodiments to a system or apparatus, and reading out and executing the supplied program code by a computer of that system or apparatus. In this case, the form of the program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of the program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, non-volatile memory card, ROM, DVD (DVD-ROM, DVD-R), and the like.

As another program supply method, a program can be supplied by establishing a connection to a home page on the Internet using a browser of a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the preset invention include a WWW server which makes a plurality of users download a program file required to implement the functional processing of the present invention by a computer.

Also, a storage medium such as a CD-ROM or the like, which stores the encrypted program of the present invention, may be delivered to a user. In this case, a user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of the actual processes based on an instruction of that program, thereby implementing the functions of the aforementioned embodiments.

Furthermore, the program read out from the recording medium may be written in a memory equipped on a function expansion board or a function expansion unit, which is inserted into or connected to the computer. In this case, after the program is written in the memory, a CPU or the like equipped on the function expansion board or unit executes some or all of the actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-098750, filed Apr. 4, 2008, which is hereby incorporated by reference herein in its entirety.

The invention claimed is:

1. A communication apparatus for executing communication complying with ITU-T Recommendations V.34, the apparatus comprising:
a determination unit configured to determine the number of frames that issue a resend request among frames received from another communication apparatus on a first primary channel;
a prediction unit configured to predict a timing at which a secondary primary channel on which a resent frame is received in response to the resend request is shifted to a control channel, based on the number of frames determined by the determination unit; and
a control unit configured to shift from the second primary channel to the control channel in accordance with the timing predicted by the prediction unit.

2. The apparatus according to claim 1, further comprising a communication speed obtaining unit configured to obtain a communication speed on the second primary channel,
wherein the prediction unit predicts the timing based on the number of frames determined by the determination unit and the communication speed obtained by the communication speed obtaining unit.

3. The apparatus according to claim 1, further comprising a detection unit configured to detect whether or not communication with the another communication apparatus is over an IP network,
wherein the control unit shifts the second primary channel to the control channel in accordance with the timing predicted by the prediction unit in a case that the detection unit detects the communication to be over the IP network, and
the control unit shifts the second primary channel to the control channel in accordance with reception of a control signal for shifting the second primary channel to the control channel from the another communication apparatus in a case that the detection unit detects the communication not to be over the IP network.

4. A control method of a communication apparatus for executing communication complying with ITU-T Recommendations V.34, the method comprising:
determining the number of frames that issue a resend request among frames received from another communication apparatus on a first primary channel;
predicting a timing at which a second primary channel on which a resent frame is received in response to the resend request is shifted to a control channel, based on the number of frames determined by the determining step; and
shifting from the second primary channel to the control channel in accordance with the timing predicted in the predicting step.

5. The method according to claim 4, further comprising obtaining a communication speed of the secondary primary channel,
wherein the timing is predicted based on the determined number of frames and the obtained communication speed.

6. The method according to claim 4, further comprising detecting whether or not communication with the another communication apparatus is over an IP network,
wherein the second primary channel is shifted to the control channel in accordance with the timing predicted in the predicting step, in the case that the detecting step detects the communication to be over the IP network, and
the second primary channel is shifted to the control channel in accordance with reception of a control signal for shifting the second primary channel to the control channel from the another communication apparatus in the case that the detecting step detects that the communication is not over the IP network.

7. A communication apparatus for executing communication complying with ITU-T Recommendations V.34, the apparatus comprising:
a control unit configured to:
(i) determine the number of frames that issue a resend request among frames received from another communication apparatus on a first primary channel;
(ii) predict a timing at which a second primary channel on which a resent frame is received in response to the resend request is shifted to a control channel, based on the determined number of frames; and
(iii) shift the second primary channel to the control channel in accordance with the predicted timing.

8. The apparatus according to claim 7, wherein the control unit further obtains a communication speed on the second primary channel,
wherein the control unit predicts the timing based on the determined number of frames and the obtained communication speed.

9. The apparatus according to claim 7, further comprising a detection unit configured to detect whether or not communication with the another communication apparatus is over an IP network,
wherein the control unit shifts the second primary channel to the control channel in accordance with the predicted timing if the detection unit detects the communication to be over the IP network, and
the control unit shifts the second primary channel to the control channel in accordance with reception of a control signal for shifting the second primary channel to the control channel from the another communication apparatus if the detection unit detects the communication not to be over the IP network.

* * * * *